Patented Sept. 22, 1931

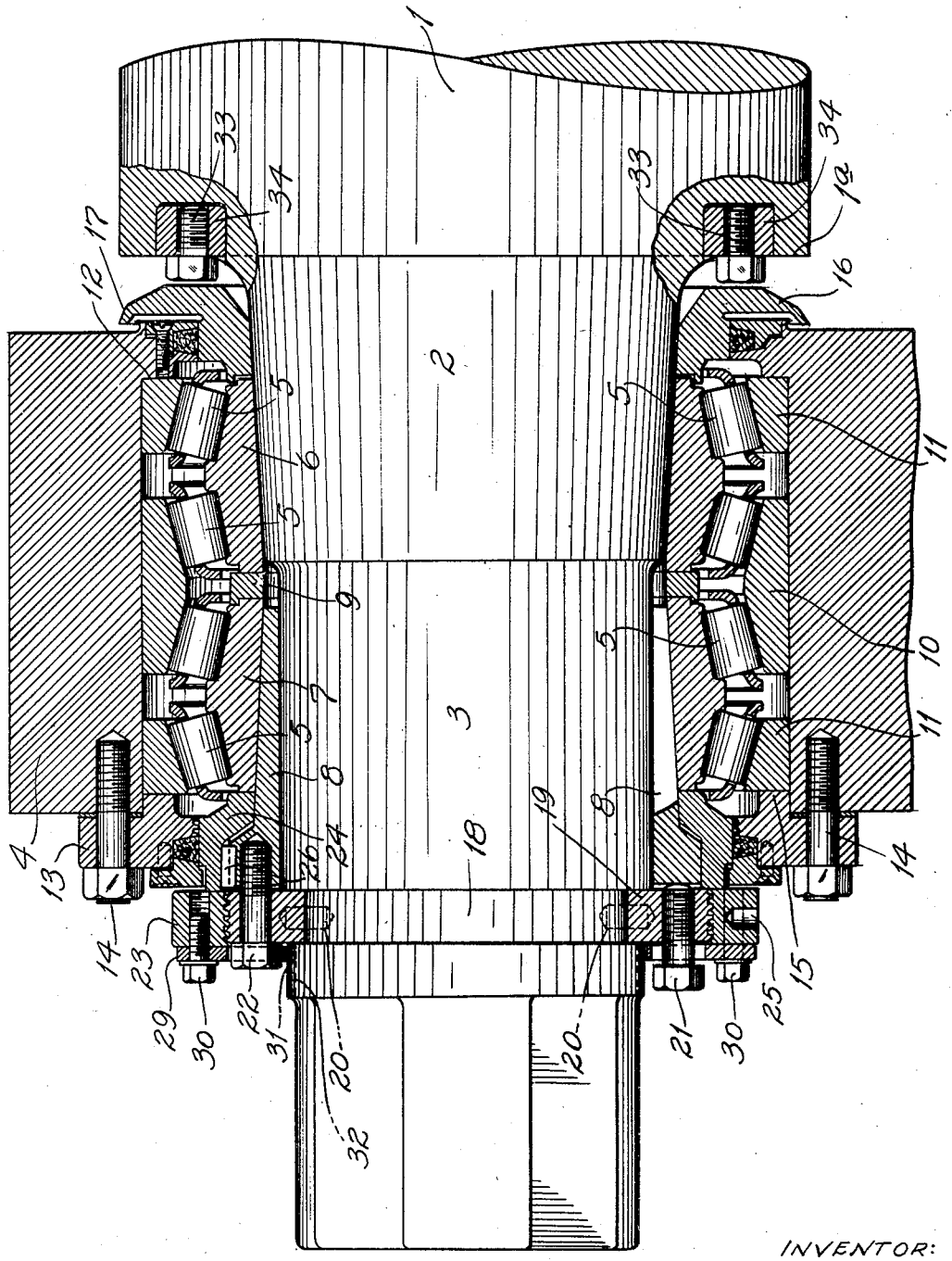

1,824,002

UNITED STATES PATENT OFFICE

SAMSON M. WECKSTEIN, OF CANTON, OHIO, ASSIGNOR TO THE TIMKEN ROLLER BEARING COMPANY, OF CANTON, OHIO, A CORPORATION OF OHIO

ROLLER BEARING CONSTRUCTION

Application filed September 7, 1929. Serial No. 390,912.

This invention relates to roller bearing constructions, particularly to roller bearing constructions for the rolls of rolling mills, in which it is necessary to remove the bearings from the rolls when the rolls are changed for work of different character or when the parts become worn or damaged. In such constructions, it is necessary to mount the inner raceways of the roller bearings tight on the rolls in order to prevent creeping of said raceways on said rolls. A practical objection of such tight fit has been the difficulty of removing said raceways, which operation frequently results in damage to the rolls or bearings or both. The principal object of the invention is to provide means for quickly and easily removing such raceways from the rolls. Other objects are simplicity and cheapness of construction, fewness of parts and compactness of design. The invention consists principally in the bearing loosening means, and in the construction, combinations and arrangements of parts hereinafter described and claimed.

The accompanying drawing, which forms part of this specification, is a vertical longitudinal section of a portion of a rolling mill frame and roll end or neck provided with a roller bearing construction embodying my invention.

Referring to the accompanying drawing, my invention is shown in connection with an antifrictionally mounted mill roll 1 having a neck portion comprising a reduced tapering inner end portion 2 and a further reduced cylindrical outer end portion 3 that extend into an opening provided therefor in a chock 4 in the standard or end frame of the rolling mill. In the construction illustrated, there are four series of taper rollers 5 on the roll neck. The four series are arranged in two groups of two series each, the inner group being provided with a common cone or inner raceway member 6, and the outer group being provided with a common cone or inner raceway member 7. The inner cone 6 is mounted tight on the reduced tapering inner end portion 2 of the roll neck; and the outer cone 7 is mounted loosely on the cylindrical outer end portion 3 of said roll neck. The outer cone 7 is provided with a conical bore, which is of larger diameter at the outer end of the cone than at the inner end thereof and is adapted to receive an externally conical split sleeve 8 that is slidably mounted on the reduced cylindrical portion 3 of the roll neck. The cones 6 and 7 are doubly coned to provide raceways for the four series of taper rollers 5 and are spaced apart the desired distance by a spacer ring 9. A doubly conical cup or outer raceway member 10 is mounted in the roll neck receiving opening of the frame or standard 4 of the mill to cooperate with the two middle series of taper rollers; and single cups 11 are likewise mounted in said opening for cooperation with the two endmost series of bearing rollers.

At the inner end of the bearing receiving opening in the chock 4 of the mill is an annular shoulder 12 against which the inner cup abuts; and at the outer end of said bearing receiving opening is a ring 13 that is secured to the outer face of said frame or standard by screws 14 and has an annular rib 15 abutting against the outer bearing cup. The annular space between the inner end of the roll neck and the bearing receiving opening in the standard of the mill is closed by means of a closure ring 16 which is sleeved on the reduced tapering portion 2 of the roll neck and is provided at its inner end with a radial flange 17 adapted to overlap the marginal portion of the inner end of the bearing receiving opening.

Mounted in an annular groove 18 located in the reduced cylindrical portion 3 of the roll neck adjacent to the outer end of the split conical sleeve 8 is a two-piece externally threaded ring or collar 19 that is secured to the roll neck for rotation therewith by means of dowel pins 20. Cap screws 21 are threaded through the collar 19 on the roll neck with their inner ends in abutting relation to the outer end of the split conical sleeve 8, thereby permitting said sleeve to be forced inwardly into the tapered bore of the outer cone 7 when said cap screws are tightened. Cap screws 22 extend loosely through holes provided therefor in the externally threaded collar 19 of the roll neck and are threaded into the end of the split conical sleeve 8, whereby tightening of these screws operates to loosen or withdraw the said sleeve from the conical bore of the outer cone 7.

Threaded on the externally threaded collar 19 of the roll neck is an internally threaded ring 23, whose inner face abuts against the outer end of a spacing sleeve 24 sleeved on the split conical sleeve 8 between the ring 23 and the outer end of the outer bearing cone 7. The ring 23 is provided in its peripheral surface with radial holes 25 for cooperation with a pin wrench, whereby said ring may be adjusted to press against the outer end of the spacing sleeve 24, which pressure is transmitted through said sleeve and the outer bearing cone 7 and spacing ring 9 to the inner bearing cone 6 to firmly seat the same on the reduced tapering portion 2 of the roll neck. The spacing sleeve 24 is held against rotation on the split conical sleeve 8 by means of a key 26 which seats in keyways provided therefor in the respective sleeves. The cone adjusting ring 19 is locked in the desired adjusted position by means of an annular plate 29, which is secured flatwise to the outer face of said ring by a series of cap screws 30 and has a detent or lug 31 in its inner periphery that seats in a longitudinal groove 32 provided therefor in the roll neck. The annular ring locking plate 29 is provided with openings adapted to accommodate the heads of the adjusting screws 21 and 22 for the split clamping sleeve 8 for the outer cone 7.

The closure ring 16 at the inner end of the bearing is slidably mounted on the reduced tapering portion 2 of the mill roll neck, with its outer end in abutting relation to the adjacent inner end of the inner bearing cone 6, and with its radial flange 17 spaced a suitable distance from the opposing end faces of the mill chock 4 and a shoulder 1a formed by the large body portion of the roll. This closure member is forced outwardly along the reduced tapering portion 2 of the roll neck and against the inner end of the cone 6 tightly fitted thereon preferably by means of a series of annularly spaced cap screws 33 located in the end of the body of the mill roll with their heads in abutting relation to the radial flange 17 at the inner end of the inner closure member 16. Each of these cap screws is threaded into a rectangular block 34 seated in a rectangular recess provided therefor in the end of the body of the roll. With this arrangement, when it is desired to remove the tight fitting inner cone 6 from the roll neck the cap screws 33 are rotated in a direction that will cause the heads thereof to advance towards and bear against the adjacent end face of the inner closure member 16, which presses against the inner end of said inner bearing cone and thus loosens or unseats the same from the tapered portion of the roll neck. In the particular construction shown, it is, of course, necessary to remove the outer bearing parts and the adjusting and securing devices therefor before the inner bearing cone is loosened.

It is obvious that the above described construction permits the removal of bearing cones that are pressed on mill rolls or shafts with sufficient firmness to resist the heavy end thrusts to which they are subject in practice. It is simple and inexpensive and permits the cones to be quickly and easily removed without the use of separate pulling devices which are difficult to apply and operate and are liable to damage the cones.

Obviously, the hereinbefore described invention admits of considerable modification, and I do not wish to be limited to the precise construction shown and described.

What I claim is:

1. A rolling mill roll having a reduced neck portion forming a shoulder adjacent to one end of said roll, a roller bearing comprising an inner raceway member fitting tight on said reduced neck portion, and means mounted in the shoulder portion of said roll for loosening said inner raceway member on said mill roll.

2. A rolling mill roll having a reduced neck portion forming a shoulder adjacent to one end of said roll, a roller bearing comprising an inner raceway member fitting tight on said reduced neck portion, and means mounted in the shoulder portion of said roll for loosening said inner raceway member on said mill roll, said means comprising a member sleeved on said neck portion of said roll between the shoulder thereon and the inner end of said inner raceway member, and a series of threaded members mounted in said shoulder and adapted to exert an endwise pressure on the sleeve member to force the latter into engagement with the inner end of said inner raceway member.

3. A rolling mill roll having a reduced tapering end portion forming a shoulder adjacent to one end of said mill roll, a roller bearing comprising an inner raceway member having a conical bore fitting tight on the reduced tapering end portion of said mill roll, and means for loosening said inner raceway member on said mill roll, said means comprising a sleeve slidable on the reduced tapering end portion of said roll between the inner raceway member thereon and the shoulder formed thereby, a series of annularly spaced blocks seated in the shoulder portion of said roll opposite the inner end of said sleeve, and screws threaded into each of said blocks with one end in abutting relation to the inner end of said sleeve.

4. A roller bearing rolling mill construction comprising a frame having an opening therein, a roll having a conical end portion extending into said opening and forming a shoulder on said roll adjacent to the inner end of said opening, a roller bearing interposed between said roll and said opening with its inner raceway member fitting tight on the conical end portion of said roll, a sleeve slidable on the conical end portion of said roll between the raceway member thereon and the shoulder formed thereby, and means mounted in the shoulder portion of said roll for forcing said sleeve against said raceway member to loosen the same from the conical end portion of said roll.

5. A roller bearing rolling mill construction comprising a frame having an opening therein, a roll having a conical end portion extending into said opening and forming a shoulder on said roll adjacent to the inner end of said opening, a roller bearing interposed between said roll and said opening with its inner raceway member fitting tight on the conical end portion of said roll, a sleeve slidable on the conical end portion of said roll between the raceway member thereon and the shoulder formed thereby, and means mounted in the shoulder portion of said roll for forcing said sleeve against said raceway member to loosen the same from the conical end portion of said roll, said means comprising a series of annularly spaced cap screws disposed parallel to the roll axis with their heads in abutting relation to the inner end of said sleeve.

Signed at Canton, Ohio, this 26 day of Aug., 1929.

SAMSON M. WECKSTEIN.